Oct. 1, 1963 J. J. FINN 3,105,893
ELECTRIC HEATING ELEMENT MOUNTING ASSEMBLY
Filed Sept. 12, 1960 2 Sheets-Sheet 2
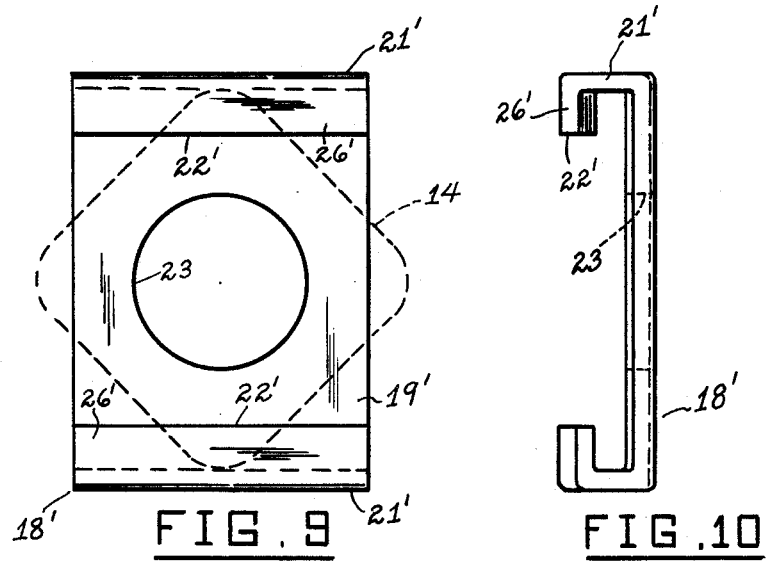
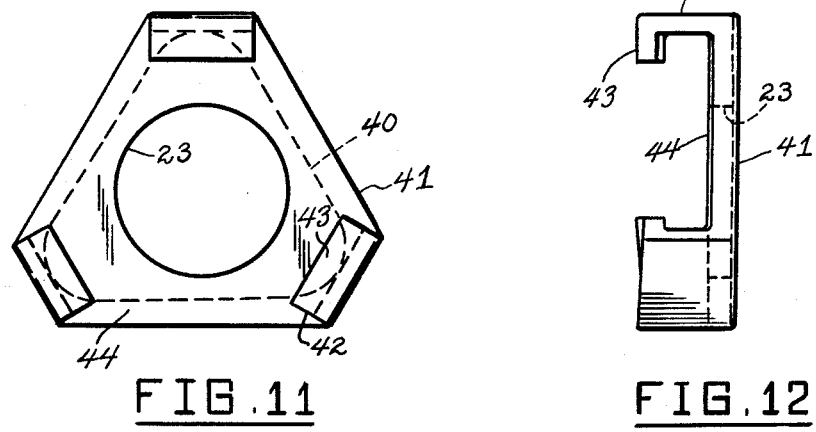
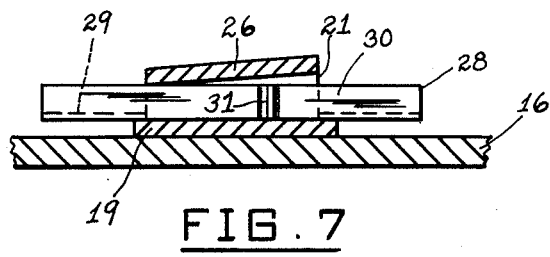
INVENTOR.
JOHN J. FINN
BY
Herman L. Gordon
ATTORNEY United States Patent Office 3,105,893
Patented Oct. 1, 1963

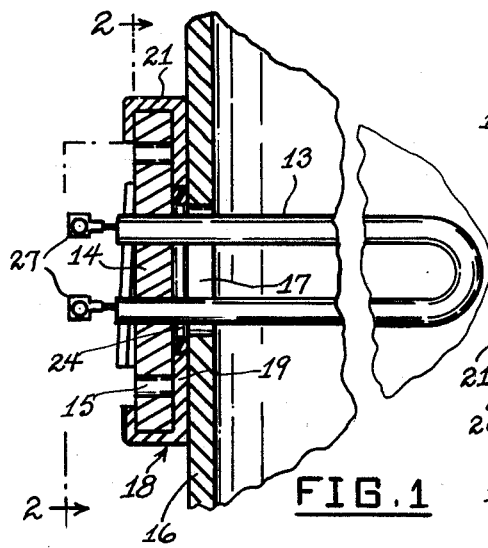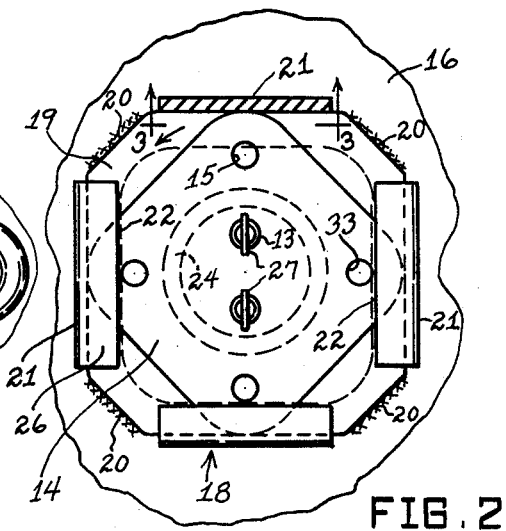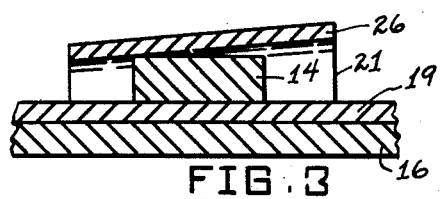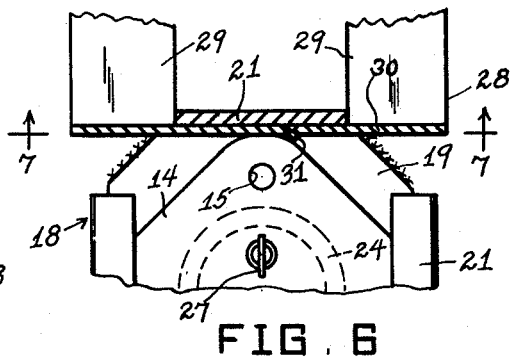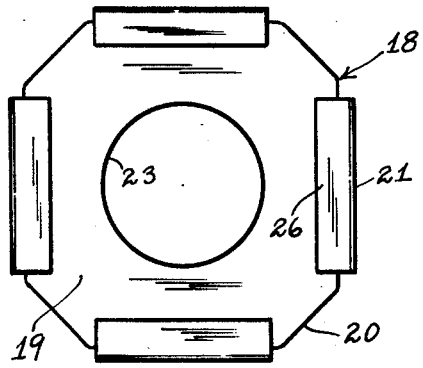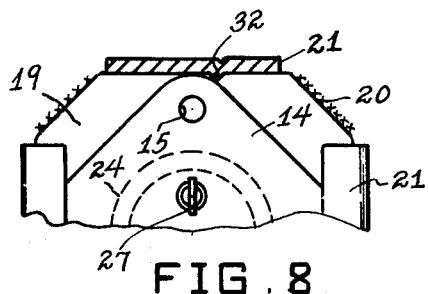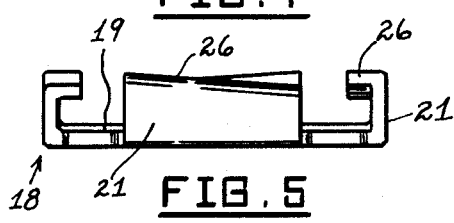

3,105,893
ELECTRIC HEATING ELEMENT MOUNTING
ASSEMBLY
John J. Finn, Rockville, Md., assignor to
Electro-Therm, Inc., Silver Spring, Md.
Filed Sept. 12, 1960, Ser. No. 55,568
16 Claims. (Cl. 219—38)

This invention relates to electric heaters, and more particularly to means for sealingly securing an electric heating element in a water tank or similar receptacle.

A main object of the invention is to provide a novel and improved means for mounting an electric heating element in a water tank or similar receptacle, said means being simple in construction, being easy to install, and providing a reliable and moisture-tight supporting connection of an electrical heating element in a boiler or similar receptacle.

A further object of the invention is to provide an improved means for mounting an electric heating element in a liquid receptacle, said means involving very inexpensive components, being durable in construction, and providing a secure and moisture-tight connection with a minimum amount of labor and expense in the installation of the heating element.

A still further object of the invention is to provide an improved self-locking mounting for supporting an electric heating element in a water tank or similar receptacle in a sealed manner, said mounting involving only one main component, which may be secured to the tank in any suitable manner, as by tack welding, after which the heating element may be quickly installed by merely rotating same in said main component through a relatively small angle.

A still further object of the invention is to provide an improved sealing support for positioning an electric heating element in a water tank or similar liquid receptacle, said support being compact in size, requiring a minimum of machining, and being arranged so that it is not necessary to use a continuous weld in fastening same to the tank, thus greatly reducing the cost of installation as over mounting assemblies previously employed for the same purpose.

A still further object of the invention is to provide an improved mounting bracket for lockingly and sealingly securing an electric heating element of the flanged type in a water boiler or similar liquid receptacle, the bracket being inexpensive to manufacture, being easy to fasten to a tank, and being provided with integral locking means for clamping the flange of the heating element and for holding it in a sealed position with respect to the tank.

Further objects and advantages of the invention will become apparent from the following description and claims and from the accompanying drawings, wherein:

FIGURE 1 is a fragmentary vertical cross-sectional view taken through an improved electric heating element supporting assembly constructed in accordance with the present invention, showing a flanged heating element sealingly supported in a water tank.

FIGURE 2 is a vertical cross-sectional view taken substantially on line 2—2 of FIGURE 1.

FIGURE 3 is an enlarged cross-sectional detail view taken on line 3—3 of FIGURE 2.

FIGURE 4 is a plan view of a clamping bracket member employed in the assembly of FIGURE 1.

FIGURE 5 is an elevational view of the bracket member of FIGURE 4.

FIGURE 6 is a fragmentary cross-sectional view similar to FIGURE 2, but showing a modified form of heating element supporting assembly according to this invention.

FIGURE 7 is a cross-sectional view taken on line 7—7 of FIGURE 6.

FIGURE 8 is a fragmentary cross-sectional view similar to FIGURES 2 and 6, but showing another modification.

FIGURE 9 is a plan view of a modified form of clamping bracket member according to the present invention.

FIGURE 10 is a side elevational view of the bracket member of FIGURE 9.

FIGURE 11 is a plan view of a further modified form of clamping bracket member according to the present invention.

FIGURE 12 is a side elevational view of the bracket member of FIGURE 11.

Various methods have been heretofore employed to mount electric heating elements in boilers and similar fluid receptacles. These methods have been directed towards providing a secure and fluid-tight connection of the element, so that the element is supported in the receptacle in heat-transmitting relation thereto while allowing the electrical connections to the element to be made externally. Thus, the heating element is conventionally of the U-shaped type, such as is shown at 13 in FIGURE 1, and is provided with a supporting flange 14, which may be generally square or of any other suitable shape, and which is provided with a plurality of bolt holes 15 adapted to receive clamping bolts for fastening the flange in a fluid-tight manner to the tank. Relatively complicated and costly assemblies have been employed, requiring careful machining of their parts to insure fluid-tight connections to the tank, and usually, a bracket has been required which must be welded to the tank continuously around its periphery.

A prime purpose of the present invention is to simplify the mounting of a conventional heating element on a boiler or other liquid receptacle by eliminating the necessity of using bolts and by eliminating the need for a continuous peripheral weld of the bracket to the tank. A further purpose of the present invention is to reduce the time and effort required to mount the element on the tank and to accomplish such mounting by a relatively simple procedure, namely, by merely rotating the element after it has been inserted to a position wherein its flange is received in the mounting bracket.

Referring to the drawings, and more particularly to FIGURES 1 to 5, 16 designates the wall of a water boiler, and 17 designates a generally circular opening formed in said wall for receiving an electric heating element 13 of the conventional flanged type above mentioned.

Designated at 18 is a bracket member which comprises a main plate portion 19 curved to conform with the curvature of the boiler wall 16 and secured thereon over the opening 17. As shown in FIGURE 2, the plate portion 19 is generally octagonal in shape and is welded to the boiler wall 16 at the respective inclined edges 20 thereof. Plate portion 19 is integrally formed at its edges between the respective successive pairs of inclined edges 20 with hook-like channel-shaped flanges 21, said flanges being spaced apart sufficiently and being of sufficient depth to receive the corner portions of the heater element flange 14 in the manner illustrated in FIGURE 2. The parallel opposing inner edges 22 of the flanges 21 are spaced apart by a distance slightly greater than the length of a side of the plate-like square flange 14 so that the flange will pass between the pairs of said opposing edges when the sides of the flange are parallel to said edges, as shown in dotted view in FIGURE 2.

The plate portion 19 is formed with a central circular opening 23 which is larger in diameter than the opening 17 and which is arranged on the same axis therewith. Disposed in the opening 23 between the flange 14 and the annular portion of wall 16 around opening 17 is an annular sealing ring 24 of resilient deformable material, such as rubber or similar sealing material. As shown in FIGURE 1, the opening 23 is sufficiently larger in diameter than the opening 17 to define an annular retaining seat for the resilient deformable O-ring gasket 24.

The hook-like flanges 21 have the inwardly extending plate-like wedging portions 26 which are inclined with respect to the main plate portion 19 in the manner illustrated in FIGURE 3, said wedging portions 26 being inclined in the same direction around the axis of the assembly, for example, being inclined downwardly and counterclockwise, as viewed in FIGURE 2. Thus, the wedging plate-like portions 26 are spaced from the main plate portion 19 so as to wedgingly engage with the corner portions of the flange 14 when said flange is rotated counterclockwise from the dotted view position thereof in FIGURE 2 substantially to the full line position thereof, namely, through approximately one-eighth of a turn. The hook-like flanges 21 are sufficiently resilient to flex slightly and to provide a tight clamping grip on the flange corner portions, while at the same time causing the flange to be forced against the O-ring 24 and causing the O-ring to deform to tightly seal the flange with respect to the boiler wall 16.

The heating element 13 is provided with the end terminals 27, 27 which may be externally connected through a suitable thermostatic switch to a source of current. The thermostatic switch may be mounted on a suitable heat-conducting bracket, such as the bracket 28 shown in FIGURES 6 and 7. The bracket 28 may comprise a pair of supporting arms 29, 29 integrally connected by a transversely extending flange member 30. The arms 29, 29 are spaced to snugly receive a hook-like flange 21 therebetween with the intermediate portion of flange member 30 received against the outer wall of the member 21, the flange 30 being of a height to be fully received in the hook-like flange 21, as shown in FIGURES 6 and 7. Member 30 is preferably formed with a transverse detent rib 31 located to lockingly interengage with the adjacent corner portion of the heater element flange 14 after said corner portion has been rotated into wedging relationship with the inclined wedging portion 26 of the hook-like flange 21 to prevent reverse rotation of the flange.

The detent element on flange 30 may comprise merely a lug formed by indenting the flange, and having the same cross-sectional shape as the element 31 shown in FIGURE 6.

Alternatively, one or more of the outer wall portions of the hook-like flanges 21 may be formed with integral detent lugs or ribs 32, as shown in FIGURE 8, located to lockingly interengage with the corner portions of the flange 14 to prevent reverse rotation of the flange after it has been rotated to wedging position in the hook-like flanges 21.

Flange 14 may be rotated to locking position by means of a suitable wrench, for example, a bar having a pair of projecting pins spaced to be received in a pair of diagonally opposite bolt holes 15 of the heater element flange 14.

As shown in FIGURES 9 and 10, a modified form of supporting bracket, designated at 18', may comprise a plate-like main portion 19' shaped to fit the contour of the boiler wall and formed with the central opening 23. The portion 19' is formed with a pair of opposed hook-like flanges 21', 21' having inclined wedging portions 26', 26' inclined in opposite directions and having inner edges 22', 22' spaced so that the heater element flange may be inserted between the hook-like flanges 21', 21' when the sides of flange 14 adjacent the edges 22' are substantially parallel thereto. Thereafter, the flange 14 may be rotated substantially one quarter turn to the wedging position thereof, shown in dotted view in FIGURE 9. As shown, the distance between the outer walls of the flanges 21', 21' is sufficient to allow the diagonal of the flange 14 to be received between said outer walls.

When a heating element is used having a non-circular flange which is other than square, a locking bracket of corresponding general shape may be employed. Thus, as shown in FIGURES 11 and 12, the flange, shown in dotted view at 40, may be generally triangular, and the locking bracket, shown at 41, is of generally corresponding shape. Each corner of the bracket is provided with a hook-like locking flange 42 having an inclined inwardly projecting wedging portion 43, the portions 43 being all inclined in the same direction around the axis of the bracket. The locking flanges 42 are spaced apart sufficiently to allow the flange 40 to be inserted in the bracket so that by rotating flange 40 the corners thereof will be caused to enter the locking flanges 42 and to be wedged between the portions 43 and the main plate-like body 44 of the bracket.

In each of the embodiments illustrated in FIGURES 9 to 12, detent means such as that illustrated in FIGURES 6 and 8 may be employed to lockingly interengage with the corners of the heater element flange to prevent reverse rotation of the flange after it has been rotated to locking position.

While certain specific embodiments of electric heater element mounting assemblies have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a fluid receptacle having a wall provided with an opening, an electric heating element rotatably mounted in said opening, a plate-like flange on said heating element of non-circular shape and having at least one peripheral edge portion extending a larger distance from its center than other peripheral edge portions, a bracket member secured to said wall adjacent said opening, fluid-tight sealing means between said flange and said wall, and channel-shaped means on the bracket member lockingly engageable around said one peripheral edge portion responsive to rotation of the heating element, said channel-shaped means having its longitudinal axis extending substantially in the circumferential direction of rotation of said heating element.

2. The structure of claim 1, and wherein said channel-shaped means comprises an inwardly facing hook-like element.

3. The structure of claim 1, and wherein said channel-shaped means has an inclined top wall portion wedgingly engageable with said one peripheral edge portion.

4. The structure of claim 1, and wherein said plate-like flange is polygonal in shape and said one peripheral edge portion is a corner of the flange.

5. The structure of claim 1, and detent means on the inside wall of the channel-shaped means lockingly engageable with said one peripheral edge portion.

6. The structure of claim 4, and wherein the channel-shaped means has an inside wall portion provided with detent means lockingly engageable with said corner.

7. In combination, a fluid receptacle having a wall provided with an opening, an electric heating element rotatably mounted in said opening, a plate-like flange on said heating element of non-circular shape and having at least one peripheral edge portion extending a larger distance from its center than other peripheral edge portions, a bracket secured to said wall adjacent said opening and being formed with another opening larger than and concentric with said first-named opening, defining a seat around said first-named opening, a sealing ring mounted in said seat, and means on the bracket located to clampingly engage around said one peripheral edge portion of said flange and to hold the flange in contact with said sealing ring responsive to rotation of the heating element.

8. In combination, a fluid receptacle having a wall provided with an opening, an electric heating element rotatably mounted in said opening, a polygonal flange having a plurality of corner portions on the heating element, a bracket secured to said wall adjacent said opening and being formed with another opening larger than and concentric with said first-named opening, defining a seat around said first-named opening, a sealing ring mounted in said seat, and a plurality of spaced inwardly facing hook-like elements on the bracket located to clampingly engage corner portions of said flange and to hold the flange in contact with said sealing ring responsive to rotation of the heating element.

9. In combination, a fluid receptacle having a wall provided with an opening, an electric heating element rotatably mounted in said opening, a non-circular plate-like flange on the heating element adjacent said opening having spaced peripheral edge portions extending a larger distance from its center than other peripheral edge portions, fluid-tight sealing means between said flange and said wall, and a plurality of inwardly facing channel-shaped hook-like elements on the wall spaced to define clearance for the flange therebetween, said hook-like elements being located to at times receive said first-named peripheral edge portions responsive to rotation of the heating element, each channel-shaped element having its longitudinal axis extending substantially in the circumferential direction of rotation of said heating element.

10. The structure of claim 9, and wherein said channel-shaped elements have inclined top wall portions wedgingly engageable with said first-named peripheral edge portions.

11. The structure of claim 9, and detent means inside at least one of the hook-like elements lockingly engageable with one of said first-named peripheral edge portions when the heating element has been rotated to a predetermined position.

12. In combination, a fluid receptacle having a wall provided with an opening, an electric heating element rotatably mounted in said opening, a non-circular plate-like flange on the heating element adjacent said opening having spaced peripheral edge portions extending a larger distance from its center than other peripheral edge portions, a plurality of inwardly facing hook-like elements on the wall spaced to define clearance for the flange therebetween and located to at times receive said first-named peripheral edge portions of the flange responsive to rotation of the heating element, and a sealing ring surrounding said opening and seated between the flange and said wall.

13. In combination, a fluid receptacle having a wall provided with an opening, an electric heating element rotatably mounted in said opening, a non-circular plate-like flange on the heating element adjacent said opening having spaced peripheral edge portions extending a larger distance from its center than other peripheral edge portions, a plurality of inwardly facing hook-like elements on the wall spaced to define clearance for the flange therebetween and located to at times receive said first-named peripheral edge portions of the flange responsive to rotation of the heating element, inclined wedging surfaces on the hook-like elements clampingly engageable with said first-named peripheral edge portions, and a sealing ring surrounding said opening and seated between the flange and said wall.

14. In combination, a fluid receptacle having a wall provided with an opening, an electric heating element rotatably mounted in said opening, a non-circular plate-like flange on the heating element adjacent said opening having spaced peripheral edge portions extending a larger distance from its center than other peripheral edge portions, a plurality of inwardly facing hook-like elements on the wall spaced to define clearance for the flange therebetween and located to at times receive said first-named peripheral edge portions of the flange responsive to rotation of the heating element, inclined wedging surfaces on the hook-like elements clampingly engageable with said first-named peripheral edge portions, a sealing ring surrounding said opening and seated between the flange and the wall, and detent means inside at least one of the hook-like elements lockingly engageable with one of said first-named peripheral edge portions when the heating element has been rotated to a predetermined position.

15. In combination, a receptacle having a wall provided with an opening, an electric heating element rotatably mounted in said opening, a non-circular plate-like flange on the heating element adjacent said opening having spaced peripheral edge portions extending a larger distance from its center than other peripheral edge portions, a bracket secured to said wall adjacent said opening and being formed with an opening larger than the first-named opening and concentric therewith, whereby to define a seat, a sealing ring mounted in said seat, and a plurality of inwardly facing hook-like elements on the bracket spaced to define clearance for the flange therebetween and located to at times receive said first-named peripheral edge portions of the flange and to hold the flange in contact with the sealing ring.

16. In combination, a receptacle having a wall provided with an opening, an electric heating element rotatably mounted in said opening, a non-circular plate-like flange on the heating element adjacent said opening having spaced peripheral edge portions extending a larger distance from its center than other peripheral edge portions, a bracket secured to said wall adjacent said opening and being formed with an opening larger than the first-named opening and concentric therewith, whereby to define a seat, a sealing ring mounted in said seat, a plurality of inwardly facing hook-like elements on the bracket spaced to receive the flange therebetween and located to at times receive said first-named peripheral edge portions of the flange and to hold the flange in contact with the sealing ring, and inclined wedging surfaces on the hook-like elements clampingly engageable with said first-named peripheral edge portions.

References Cited in the file of this patent

UNITED STATES PATENTS

| 1,602,225 | Gough | Oct. 5, 1926 |
| 1,875,306 | Williams | Aug. 30, 1932 |
| 2,217,595 | Morgan et al. | Oct. 8, 1940 |
| 2,486,675 | Pokras | Nov. 1, 1949 |

FOREIGN PATENTS

| 649,885 | France | Sept. 10, 1928 |
| 474,324 | Great Britain | Oct. 29, 1937 |
| 512,017 | Canada | Apr. 19, 1955 |